United States Patent
Holzapfel

(10) Patent No.: US 9,848,730 B2
(45) Date of Patent: Dec. 26, 2017

(54) FOOD CARRIER AND GRILLING ACCESSORY

(71) Applicant: Rational Aktiengesellschaft, Landsberg am Lech (DE)

(72) Inventor: Wolfgang Holzapfel, Munich (DE)

(73) Assignee: Rational Aktiengesellschaft (DE)

( * ) Notice: Subject to any disclaimer, the term of this patent is extended or adjusted under 35 U.S.C. 154(b) by 442 days.

(21) Appl. No.: 14/567,108

(22) Filed: Dec. 11, 2014

(65) Prior Publication Data
US 2015/0164272 A1    Jun. 18, 2015

(30) Foreign Application Priority Data
Dec. 13, 2013 (DE) .................. 20 2013 105 686 U

(51) Int. Cl.
     *A47J 37/00*      (2006.01)
     *A47J 37/06*      (2006.01)
     *F24C 15/16*      (2006.01)

(52) U.S. Cl.
CPC .............. *A47J 37/06* (2013.01); *A47J 37/067* (2013.01); *A47J 37/0611* (2013.01); *A47J 37/0694* (2013.01); *F24C 15/16* (2013.01)

(58) Field of Classification Search
CPC .. A47J 37/0611; A47J 37/0892; A47J 37/067; A47J 37/0694
USPC ......... 99/376, 395, 396, 397, 402, 388, 393, 99/450, 422, 445
See application file for complete search history.

(56) References Cited

U.S. PATENT DOCUMENTS

| | | | | |
|---|---|---|---|---|
| 2,066,507 A | * | 1/1937 | Yost ..................... | A47J 37/0611 219/524 |
| 2,198,647 A | * | 4/1940 | Wolcott .................. | A47J 37/10 99/340 |
| 4,492,152 A | * | 1/1985 | DeSantis ............. | A47J 37/0694 99/397 |
| 4,862,791 A | | 9/1989 | Baughey | |
| 5,974,954 A | * | 11/1999 | Rigney ............... | A47J 37/0786 99/396 |
| 6,024,014 A | * | 2/2000 | Kasai .................... | A47J 37/067 99/400 |
| 2007/0204856 A1 | | 9/2007 | Elwell et al. | |
| 2009/0206074 A1 | | 8/2009 | Schneider et al. | |
| 2009/0206075 A1 | | 8/2009 | Lafferty | |
| 2013/0118475 A1 | | 5/2013 | Armstrong et al. | |

FOREIGN PATENT DOCUMENTS

| | | |
|---|---|---|
| DE | 202005002549 U1 | 6/2005 |
| DE | 202011001853 U1 | 4/2011 |
| DE | 202011002323 U1 | 6/2011 |
| JP | 2004215868 A | 8/2004 |

\* cited by examiner

*Primary Examiner* — Reginald L Alexander
(74) *Attorney, Agent, or Firm* — Hayes Soloway PC

(57) ABSTRACT

A food carrier for use in a cooking space of a cooking appliance has a first cooking area and a second cooking area on which a food to be cooked can be placed. The cooking areas can in particular be grilling areas. The first and the second cooking areas are arranged on opposite sides of the food carrier, and each of the first and second cooking areas has a structuring. The structuring of the first cooking area is different from the structuring of the second cooking area.

9 Claims, 6 Drawing Sheets

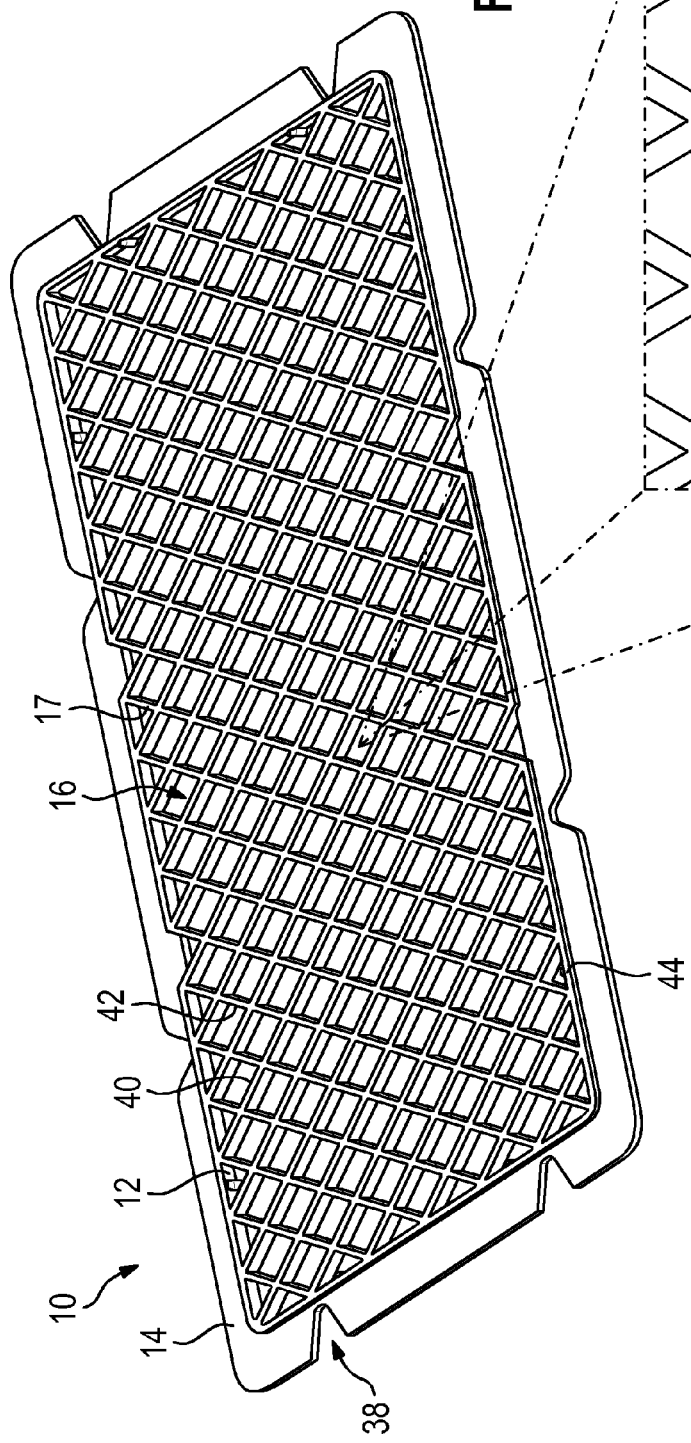
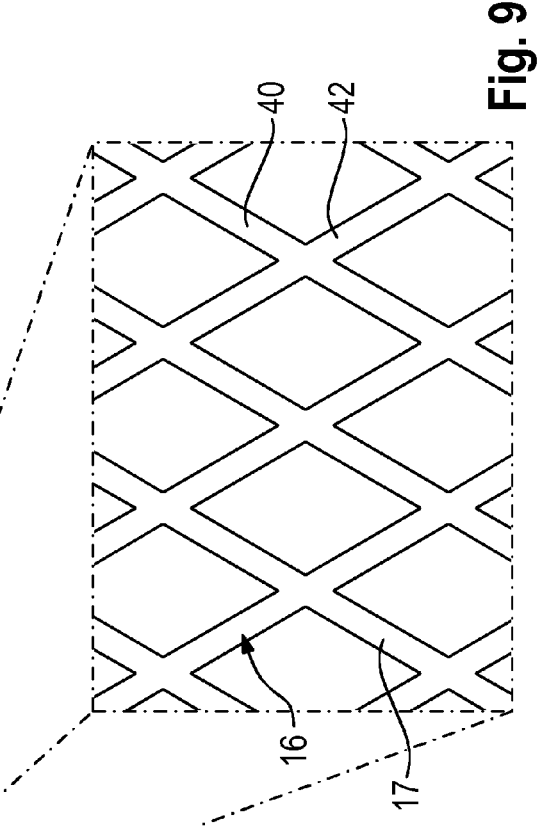

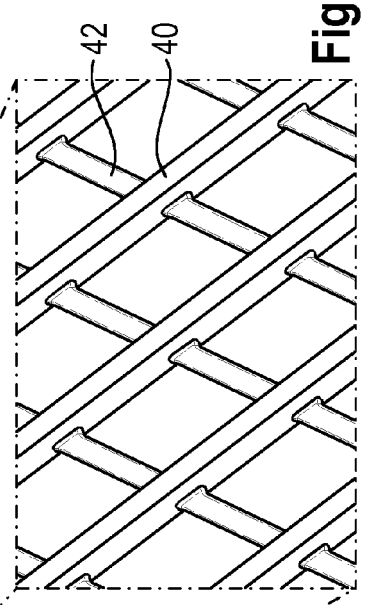
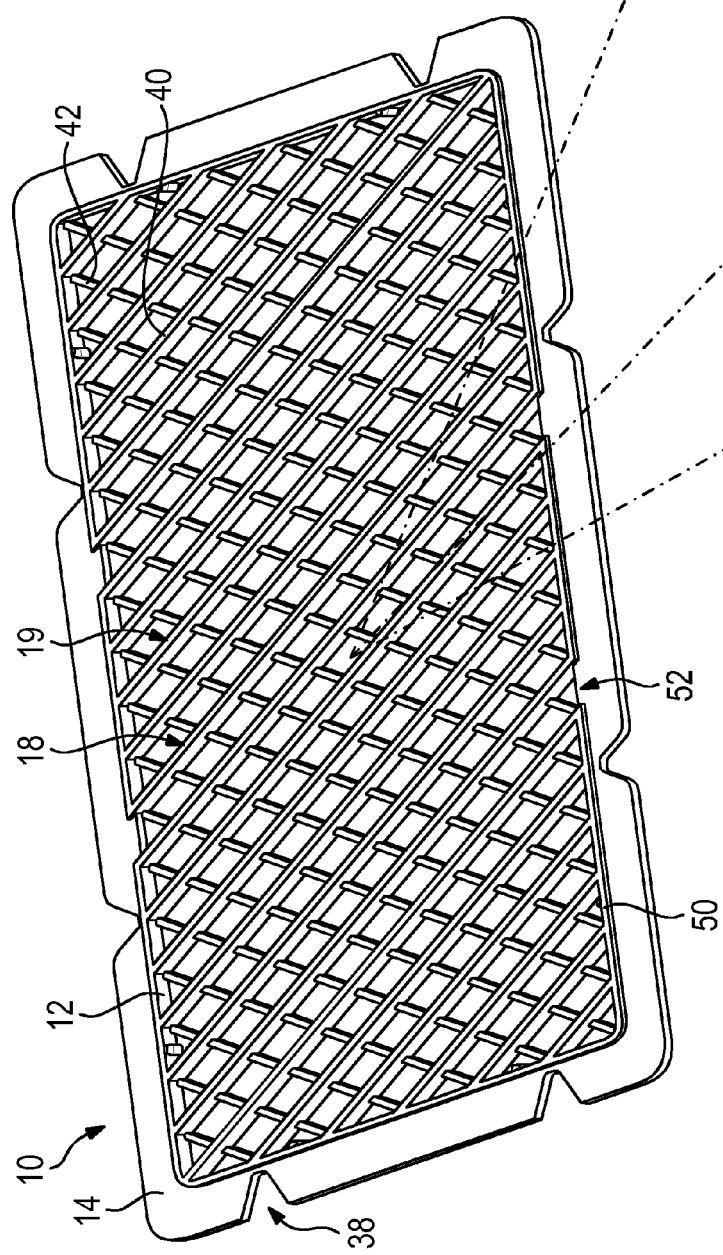

FOOD CARRIER AND GRILLING ACCESSORY

This invention relates to a food carrier as well as a grilling accessory for use in a cooking space of a cooking appliance.

BACKGROUND OF THE INVENTION

From the prior art, food carriers are known which include a structured cooking area on which a food to be cooked can be placed. The food carrier along with the food lying on the structured cooking area is introduced into a cooking space of a cooking appliance. When cooking the food, the surface of the food with which the same lies on the structured cooking area receives the pattern of the structuring of the cooking area. Typically, a structured cooking area is employed when cooking meat, in order to produce a typical grill pattern in the surface of the meat. However, other items of food also can be provided with other patterns or it can generally be desired to have a variety of patterns on one and the same food, so that different food carriers with different patterns must be used. It is disadvantageous, however, that the different food carriers must be stowed away when not in use.

Furthermore, it can be desired that both surfaces of the food should have a pattern, so that the food on the food carrier must be turned during the cooking process. When the food now should have different patterns on its two surfaces, it is not only necessary to turn the food, but the food carrier also must be exchanged during the cooking process, which results in an increased expenditure of work.

It is the object of the invention to provide a space-saving and simple possibility for providing items of food with different patterns.

BRIEF DESCRIPTION OF THE INVENTION

According to the invention, this object is solved by a food carrier for use in a cooking space of a cooking appliance, with a first cooking area and a second cooking area, on which a food to be cooked can be placed, in particular grilling areas, wherein the two cooking areas are arranged on opposite sides of the food carrier and have a different structuring. It is the idea underlying the invention to provide a food carrier which has two different structurings, so that one and the same food carrier can produce two different patterns in the food. Such food carrier thus can be referred to as turning food carrier. The number of the required food carriers can be reduced, whereby the required stowage space for the different food carriers is halved. Depending on the desired pattern on the food, the one or the other side of the food carrier can be used, so that the food carrier also can be utilized for different items of food, which typically have different patterns. Structuring is understood to be a structure different from an even surface.

One aspect of the invention provides that the structurings are formed by an integral body of the food carrier, which provides both the structuring on the first cooking area and the structuring on the second cooking area. Due to the integral design it is ensured that the food carrier can be cast in one manufacturing step. Furthermore, it thereby is ensured that there is a good conduction of heat through the entire food carrier, in particular to the two cooking areas.

According to one aspect of the invention, the food carrier is formed of metal. Metal represents a particularly suitable material with regard to the thermal conductivity and stability.

In particular, the first cooking area has a cross or rhombic structuring and the second cooking area has a stripe structuring. By means of the two structurings, the two most typical grill patterns can be produced in a food.

The object of the invention furthermore is solved by a grilling accessory for use in a cooking space of a cooking appliance, which includes two food carriers with at least one cooking area each, which contact a food at the same time, wherein the food carriers are arranged to each other such that the respective cooking areas face each other. With such grilling accessory it can be achieved that the food is cooked from both sides at the same time via the cooking areas. Turning the food on the food carrier thereby can be saved, whereby the expenditure during cooking of the food is reduced correspondingly. In addition, it is ensured that the food is uniformly cooked from both sides, so that the core of the food reaches the desired cooking point.

In particular, the two cooking areas can have a different structuring. The two surfaces of a food thereby can be cooked at the same time and nevertheless have different patterns.

According to a first embodiment, the two food carriers are connected with each other via a guiding element. Via the guiding element, the food carriers can be connected with each other in a simple way, so that after placing the food on the first food carrier, the second food carrier can be inserted with a precise fit via the guiding element.

According to a further embodiment, the two food carriers are connected with each other via a fixing element. This connection of the two food carriers represents a particularly simple possibility of connection. The two food carriers for example can include an opening through which the fixing element is introduced, in order to connect the two food carriers with each other. The fixing element can be a simple metal clip.

A further embodiment provides that the two food carriers are connected with each other via a joint or a suspension. A food to be cooked thereby can be placed on one of the two food carriers, wherein the other food carrier is pressed down via the joint or the suspension, so that the food is kept pressed between the two cooking areas. The effect then is similar to a waffle iron. By the pressure produced it can be achieved that the food is cooked uniformly over its entire size. Especially with this embodiment it is possible to cook items of food of different heights from both sides at the same time. The joint or the suspension also can be formed as separate element which is attached to the food carriers.

A further aspect of the invention provides that the food carriers are formed according to the type mentioned above. Thus, two food carriers with two differently structured cooking areas each can be connected with each other by means of a joint or a suspension, a fixing element or a guiding element, in order to be converted to a grilling accessory. In this way, a great variability can be produced, as in a grilling accessory in general up to four different structurings of the cooking areas can be used. Such grilling accessory thus is constructed in a modular fashion.

BRIEF DESCRIPTION OF THE DRAWINGS

Further advantages and features of the invention can be taken from the following description and the drawings to which reference is made. In the drawings:

FIG. 8 shows a top view of a first cooking area of a food carrier of the invention according to a second embodiment, FIG. 9 shows a detail view of FIG. 8, FIG. 12 shows a top view of a second cooking area of the food carrier of the invention as shown in FIG. 8, and FIG. 13 shows a detail view of FIG. 12.

DETAILED DESCRIPTION OF THE INVENTION

Figure 1:
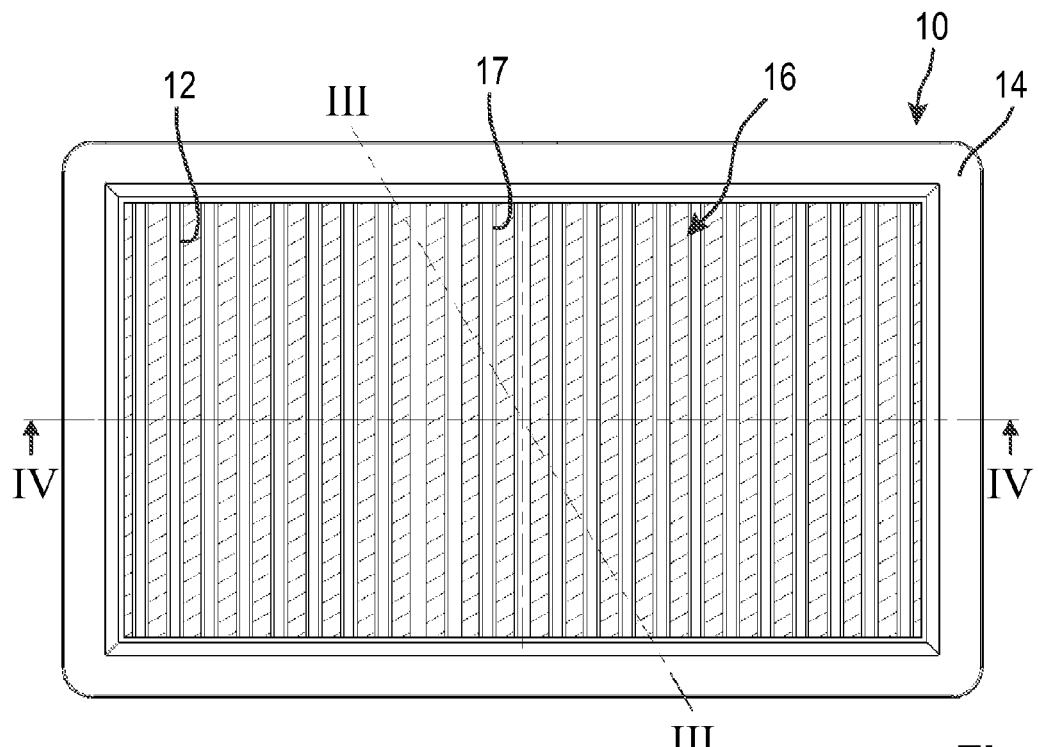
FIG. 1 shows a top view of a first cooking area of a food carrier of the invention according to a first embodiment.

FIG. 1 shows a top view of a food carrier 10. The food carrier 10 comprises a body 12 as well as a circumferential rim 14.

On its opposite sides, the body 12 is designed as cooking areas 16, 18 which are surrounded by the circumferential rim 14. The first cooking area 16 (see FIG. 1) has a first structuring 17 which is formed as stripe structuring, so that the first cooking area 16 corresponds to a grate plate.

The second cooking area 18 (see FIG. 2) also is formed for accommodating a food and has a second structuring 19 which in the illustrated embodiment is formed as cross structuring, which also is referred to as criss-cross structuring. Both cooking areas 16, 18 are formed as grilling areas.

It is also possible that instead of the cross structuring a rhombic structuring is used.

Figure 2:
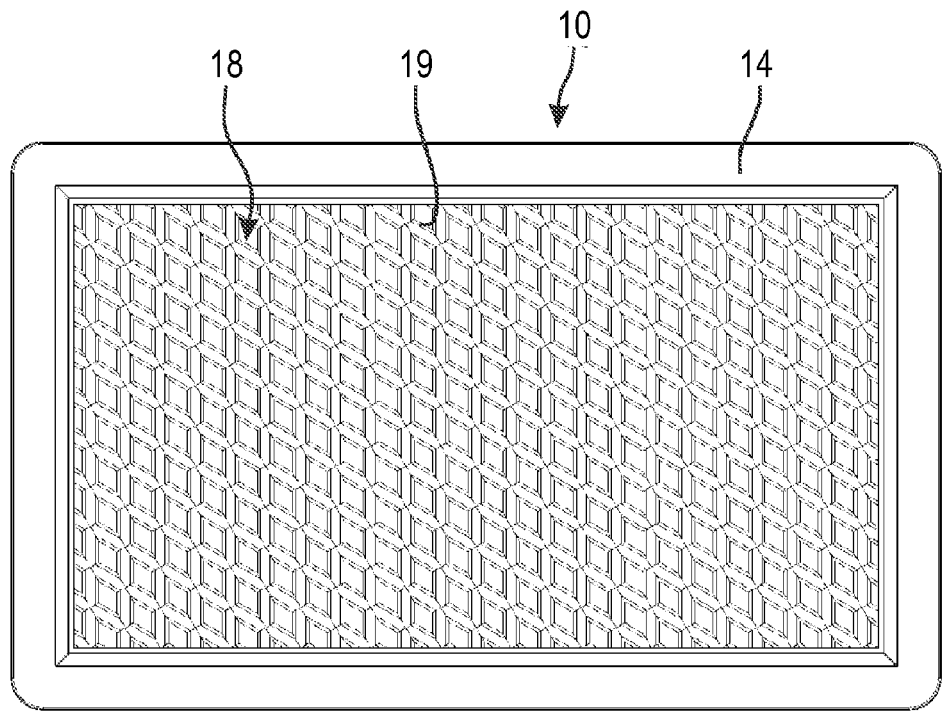
FIG. 2 shows a top view of a second cooking area of the food carrier of the invention as shown in FIG. 1.
Figure 3:
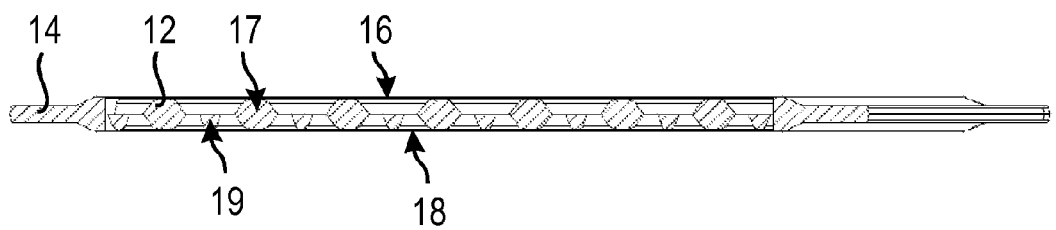
FIG. 3 shows a sectional representation through the food carrier of FIGS. 1 to 2.
Figure 4:
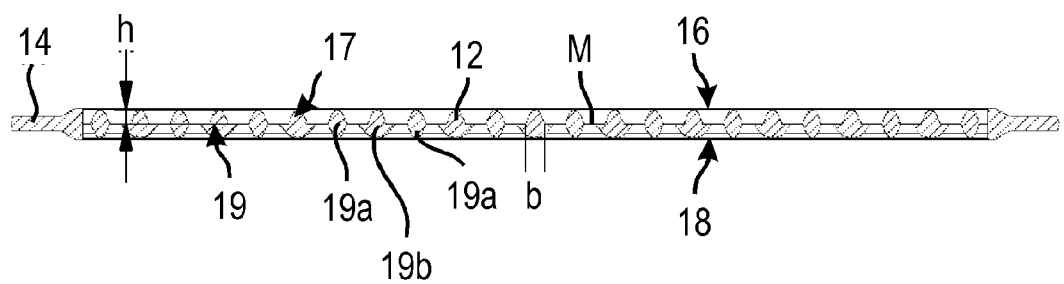
FIG. 4 shows a further sectional representation through the food carrier of FIGS. 1 to 3.

FIGS. 3 and 4 show sectional representations through the food carrier 10 of FIGS. 1 and 2, wherein FIG. 3 shows a section along line III in FIG. 1 and FIG. 4 shows a section along line IV.

FIGS. 3 and 4 reveal that the body 12 of the food carrier 10 is formed in one piece and forms the two structurings 17, 19 of the cooking areas 16, 18 on the opposite sides of the food carrier 10. Furthermore, the body 12 and the circumferential rim 14 also are formed integrally with each other, so that the entire food carrier 10 is formed in one piece. The entire food carrier 10, which can be formed of a metal, preferably is manufactured by a casting method.

Furthermore, the sectional representations reveal that the structurings 17, 19 associated to the two cooking areas 16, 18 each are formed with the same height, based on a median plane M of the body 12, wherein the respective structuring 17, 19 has a height h. The height h of a structuring 17, 19 can lie in a range from 5 mm to 10 mm, in particular amount to 7 mm. This height range ensures a sufficiently large thermal conductivity through the food carrier 10 with sufficient stability of the food carrier 10.

The structurings 17, 19 each are formed elliptical in cross-section in the broadest sense, wherein they converge to the respective cooking area 16, 18. The second structuring 19 furthermore is formed such that in cross-section it likewise has a partial stripe structuring, wherein two successive stripe elements 19a have a double distance as compared to the first structuring 17. Between two successive stripe elements 19a of the second structuring 19 broader elements 19b each are provided, so that altogether the criss-cross structuring 19 is obtained.

At the median plane M the stripe elements 19a as well as the structuring 17 have a width b which lies in the range from 5 mm to 15 mm, in particular amounts to 9.5 mm.

Figure 5:
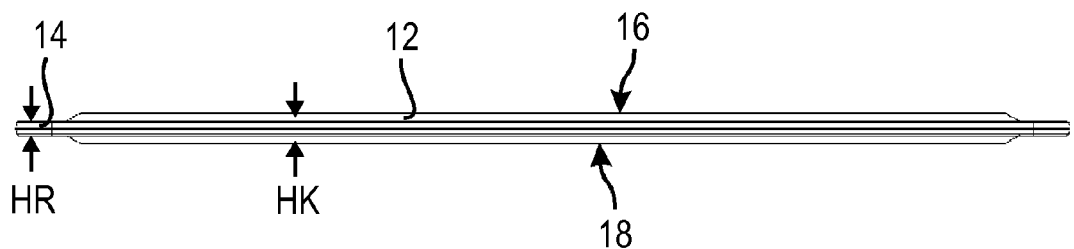
FIG. 5 shows a side view of the food carrier of FIGS. 1 to 4.

The side view of the food carrier 10 as shown in FIG. 5 reveals that the circumferential rim 14 has a height HR which is smaller than the height HK of the body 12. The ratio of the two heights HR:HK can be approximately 1:2, so that the height HR of the circumferential rim 14 approximately corresponds to the height h of one of the structurings 17, 19.

The transition from the circumferential rim 14 to the cooking areas 16, 18 is effected via ramps which include an angle between 20° and 40°, in particular 30°, to the surface of the circumferential rim 14.

Figure 6:
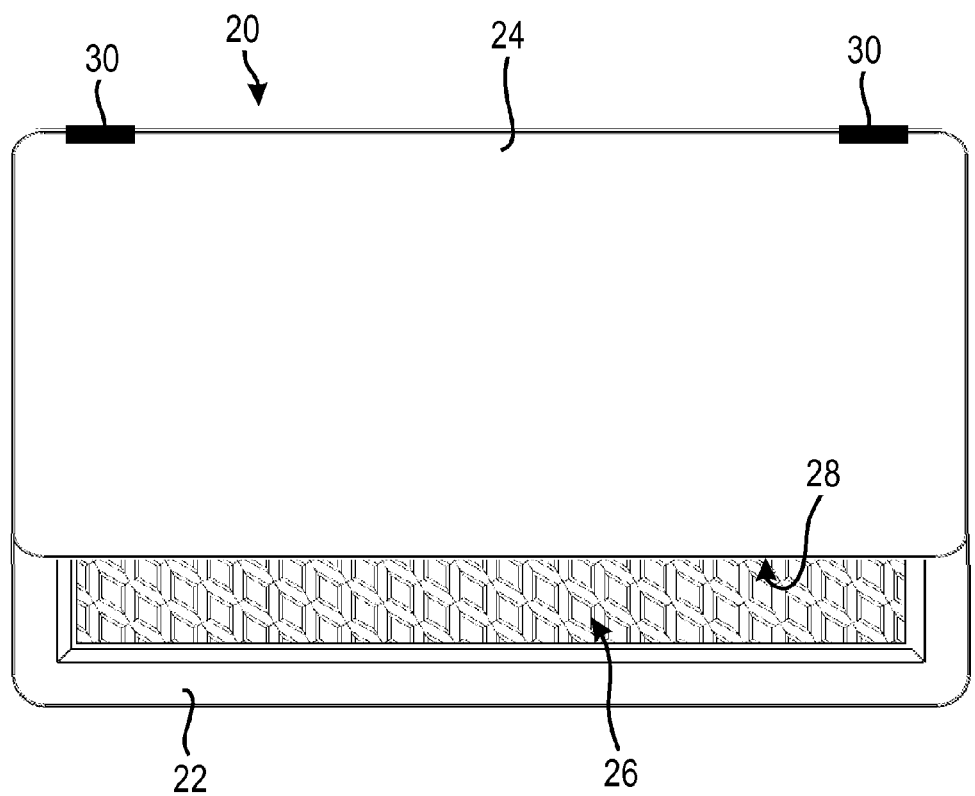
FIG. 6 shows a top view of a grilling accessory of the invention according to a first embodiment.

FIG. 6 shows a grilling accessory 20 which comprises a first food carrier 22 and a second food carrier 24 which is inclined with respect to the first food carrier 22. Both food carriers 22, 24 each have a cooking area 26, 28, which are arranged opposite each other. The cooking areas 26, 28 in addition each have a structuring, wherein only the structuring of the cooking area 26 is shown in the representation.

In the embodiment shown, the two food carriers 22, 24 are connected with each other via two joints 30, so that the second food carrier 24 can be shifted relative to the first food carrier 22.

A food to be cooked is placed on the first food carrier 22 or the first cooking area 26 of the grilling accessory 20. Subsequently, the second food carrier 24 is pivoted via the joints 30 such that the other surface of the food is contacted by the second cooking area 28 of the grilling accessory 20. It thereby is possible that the food is cooked from both sides at the same time by means of the two cooking areas 26, 28 and on both sides of the food a pattern is formed at the same time corresponding to the structuring of the cooking areas 26, 28.

The joints 30 can be formed as separate connecting elements which can be mounted to the food carriers 22, 24.

Alternatively, the two food carriers 22, 24 can be connected with each other by means of a guiding element or a fixing element, so that an easily manufacturable grilling accessory 20 is obtained. Furthermore, a cutout, depression or rib also can be provided in the rim for a clip via which the connection of the food carriers 22, 24 is provided.

In the embodiment shown the second food carrier 24 merely includes one cooking area with structuring, but it can also be provided that the food carrier 24 includes two cooking areas with different structuring.

Figure 7:
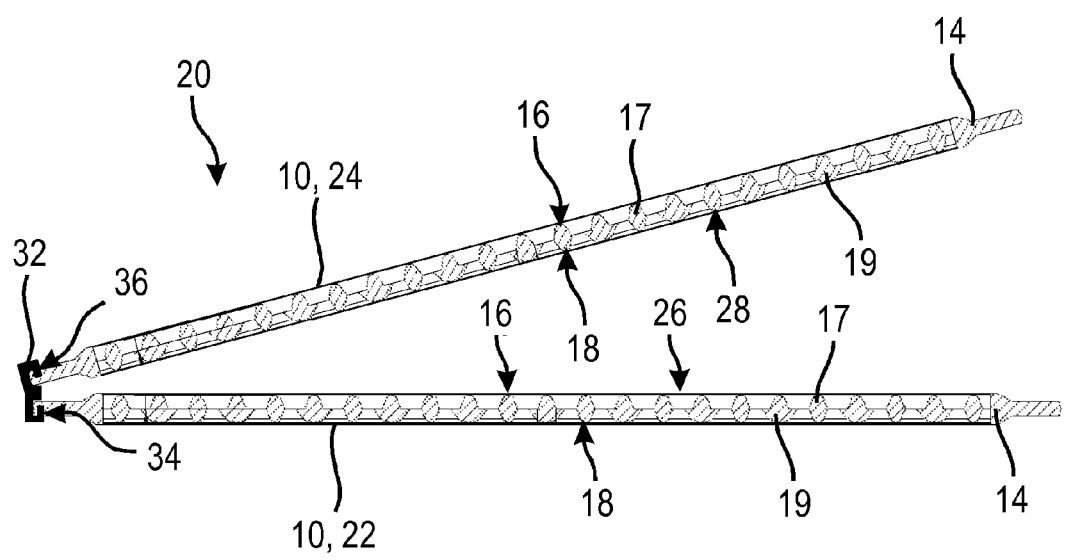
FIG. 7 shows a side view of a grilling accessory of the invention according to a second embodiment.

For the food carriers 22, 24 two of the food carriers 10 of FIGS. 1 to 5 can be used, as is shown in the embodiment of the grilling accessory 20 represented in FIG. 7.

The two food carriers 22, 24 are connected with each other via a clip 32, wherein the clip 32 engages into cutouts 34, 36 at the circumferential rim 14 of the food carriers 22, 24. Otherwise, the two food carriers 22, 24 each are formed exactly like the food carrier 10 of FIGS. 1 to 5, i.e. they each include a first cooking area 16 and a second cooking area 18 with different structuring 17, 19.

In the illustrated embodiment of the grilling accessory 20 the food carriers 22, 24 are arranged such that the first cooking area 16 of the first food carrier 22 forms the first cooking area 26 of the grilling accessory 20 and the second cooking area 18 of the second food carrier 24 forms the second cooking area 28 of the grilling accessory 20.

The relative arrangement of the food carriers 22, 24 can be changed as desired.

In addition, the two food carriers 22, 24 each can have different structurings, so that the grilling accessory 20 comprises a total of four different structurings. The food carriers 22, 24 then can be combined with each other in the desired way.

With the grilling accessory 20 it is possible to cook the food from both sides in a simple way. In particular in the embodiment of the two food carriers 22, 24 analogous to the embodiment of the food carrier 10 according to FIGS. 1 to 5 a variety of patterns can be produced in the food, and due to the modular construction required stowage space can be saved.

In FIGS. 8 to 13 a second embodiment of a food carrier 10 is shown, wherein identical or functionally identical elements are provided with the same reference numerals as in the first embodiment.

FIG. 8 shows the food carrier 10 in a perspective view. The food carrier 10 comprises a body 12 with a circumferential rim 14 which each includes recesses 38. The recesses 38 serve for the guidance and control of the flow of the casting material during manufacture, as will yet be explained below.

The food carrier 10 is shown in FIG. 8 from a first cooking area 16, which has a first structuring 17 which is formed as rhombic pattern. The first structuring 17 in particular can be seen in FIG. 9, which represents a section of the first cooking area 16 in detail.

The rhombic pattern of the first structuring 17 is formed by first struts 40, which extend parallel to each other, and by second struts 42 which likewise extend parallel to each other and intersect the first struts 40. The struts 40, 42 each have the same height, so that the surfaces of the struts 40, 42 form a plane for the first cooking area 16.

Furthermore, FIG. 8 reveals that the first cooking area 16 is slightly stepped from the rim 14, as a substantially circumferential first edge 44 is provided, with which the first structuring 17 terminates flush, in particular the struts 40, 42. This is also shown in FIG. 10, which shows a detail view of the transition of the first cooking area 16 to the rim 14.

Figure 10:
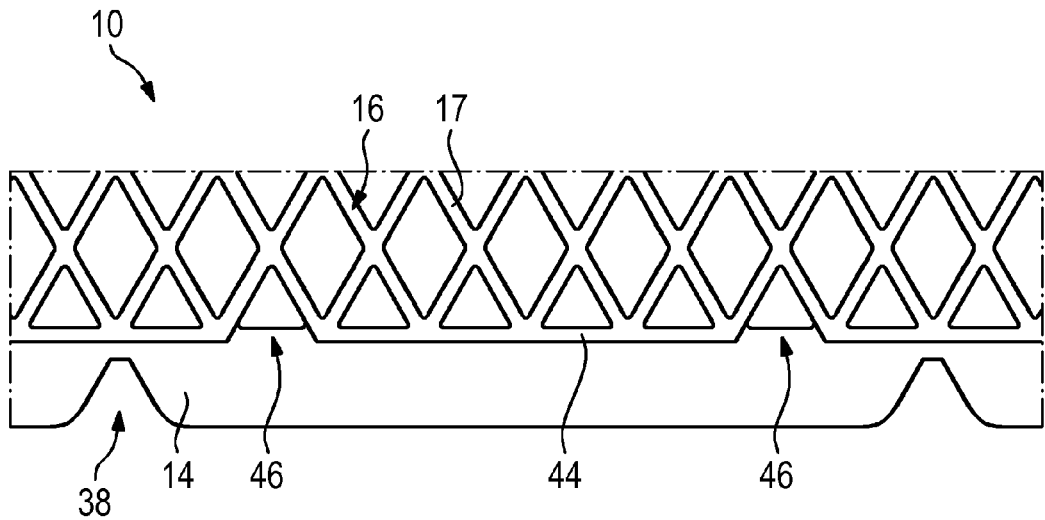
FIG. 10 shows a further detail view of FIG. 8.

FIG. 10 in addition clearly shows that the first edge 44 includes symmetrical first cutouts 46. These symmetrical first cutouts 46 are important during the manufacture of the food carrier 10, as the flow of the casting material can be influenced thereby. In particular, the flow of material is braked in the rim regions, so that during the manufacture a substantially homogeneous casting material front runs through the casting mold. It thereby is ensured that on the one hand no air inclusions occur within the cast food carrier 10 and on the other hand casting material meeting with each other substantially has the same temperature.

This is analogously true for the recesses 38 in the circumferential rim 14, as mentioned already.

Figure 11:
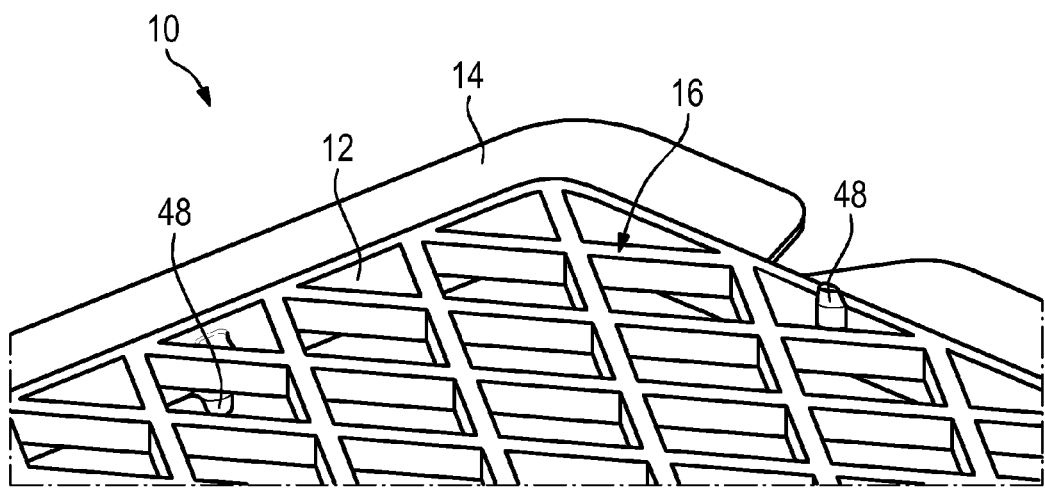
FIG. 11 shows a further detail view of FIG. 8.

FIG. 11 shows a further detail view of the first cooking area 16. This detail view shows protrusions 48 which are arranged in the rim region of the first cooking area 16 and extend across the plane of the first cooking area 16.

Furthermore, FIG. 11 reveals that the protrusions 48 analogously are associated to the second cooking area 18 which is provided opposite to the first cooking area 16. The protrusions 48 also extend across the plane of the second cooking area 18.

In general, the protrusions 48 act as stacking protection, since the protrusions 48 cooperate with the circumferential first edge 44 of a directly adjacent food carrier 10 of a stack of food carriers 10, in order to prevent slipping of the food carriers 10 relative to each other. For this purpose, the protrusions 48 laterally engage the circumferential first edge 44, so that slipping in the plane is prevented. For this purpose, the protrusions 48 in particular can be provided on all sides of the food carrier 10.

Furthermore, it is ensured by the protrusions 48 that a food carrier 10 put down on a deposition area does not directly rest on the deposition area via the respective cooking area 16, 18, but via the protrusions 48 which protrude from the respective cooking area 16, 18. This is important in particular when the cooking areas 16, 18 are provided with a coating which might be damaged.

FIG. 12 shows the food carrier 10 in a perspective view from the second cooking area 18. The second cooking area 18 has a second structuring 19 which differs from the first structuring 17 of the first cooking area 16. In the embodiment shown, the second structuring 19 is formed as stripe pattern, wherein the stripes extend at an angle with respect to the circumferential rim 14, i.e. not parallel to one of the edges of the circumferential rim 14.

Accordingly, the two structurings 17, 19 differ from a smooth, continuously even surface like that of a plate.

Analogous to the first cooking area 16, the second cooking area 18 is delimited against the rim 14 via a substantially circumferential second edge 50, wherein the second structuring 19 merges into the second edge 50.

Furthermore, the protrusions 48 also can cooperate with the circumferential second edge 50, in order to prevent slipping of the food carriers 10 when they are stacked.

The second structuring 19 formed as stripe pattern is realized in that the struts 40, 42 of the first structuring 17 formed as rhombic pattern, which extend parallel to each other, have a different depth. This can be taken in particular from FIG. 13, which shows a detail view of FIG. 12.

Due to the different depth, the one struts 40 are part of the first structuring 17 and at the same time form the second structuring 19, wherein opposite sides of these struts 40 serve this purpose.

The difference in height of these struts 40, 42 is such that the one struts 40, which at the same time form the second structuring 19, pass over flush into the second edge 50, whereas the other struts 42 only are so high that they pass over flush into the circumferential rim 14.

The integrally formed food carrier 10 thereby can be manufactured in a particularly simple way by means of a casting method.

The second edge 50 likewise includes symmetrical second cutouts 52, in order to correspondingly control the flow of the casting material during manufacture.

Both cooking areas 16, 18 thus are delimited from the rim 14 surrounding the respective cooking areas 16, 18 by a substantially circumferential edge 44, 50.

The embodiment of the food carrier 10 as shown in FIGS. 8 to 13 can be used in a way analogous to the first embodiment, which is shown in FIGS. 1 to 5, in order to form the grilling accessory 20.

Both embodiments of the food carrier 10 are characterized in that they are a turning food carrier which has two cooking areas 16, 18 on opposite sides, wherein both cooking areas 16, 18 can be used for cooking food. Both cooking areas 16, 18 also have a different structuring 17, 19, so that in the respective use a different grill pattern is obtained on the surface of the food.

Furthermore, both embodiments of the food carrier 10 do not have a smooth, continuously even surface as cooking area, but always a structured surface, so that a grill pattern can be produced in the surface of the food.

Furthermore, both embodiments are formed such that they have recessed cooking areas 16, 18. The food carriers 10 thereby can be manufactured in a correspondingly material-saving way, in particular by a casting method. In addition, the openings in the cooking areas 16, 18 can serve for the liquid of the food to flow off. Furthermore, hot air or steam can flow through the openings, in order to cook the food which is arranged on the respective cooking area 16, 18.

The invention claimed is:

1. A food carrier for use in a cooking space of a cooking appliance, with a first cooking area and a second cooking area on which a food to be cooked can be placed, in particular grilling areas, wherein the first and second cooking areas are arranged on opposite sides of the food carrier, each of the first and second cooking areas having a structuring, the structuring of the first cooking area being different from the structuring of the second cooking area, and wherein the first cooking area has a stripe structuring and the second cooking area has a cross or rhombic structuring.

2. The food carrier of claim 1 wherein the structurings are formed by an integral body of the food carrier, which provides both the structuring on the first cooking area and the structuring on the second cooking area.

3. The food carrier of claim 1 wherein the food carrier is formed of metal.

4. A grilling accessory for use in a cooking space of a cooking appliance, which includes two food carriers with at least one cooking area each, which contact a food at the same time, wherein the food carriers are arranged to each other such that the respective cooking areas face each other, and wherein at least one of the two food carriers is the food carrier of claim 1.

5. The grilling accessory of claim 4 wherein each of the two cooking areas has a structuring, the structuring of a first of the two cooking areas being different from the structuring of the second of the two cooking areas.

6. The grilling accessory of claim 4 wherein the two food carriers are connected with each other via a guiding element.

7. The grilling accessory of claim 4 wherein the two food carriers are connected with each other via a fixing element.

8. The grilling accessory of claim 4 wherein the two food carriers are connected with each other via a joint or a suspension.

9. The grilling accessory of claim 4 wherein each of the food carriers has a first cooking area and a second cooking area on which a food to be cooked can be placed, in particular grilling areas, wherein the first and second cooking areas are arranged on opposite sides of the food carrier, each of the first and second cooking areas having a structuring, the structuring of the first cooking area being different from the structuring of the second cooking area.

* * * * *